Dec. 26, 1944.　　　E. E. SLICK　　　2,366,066
MANUFACTURE OF GLASSWARE
Filed Jan. 30, 1941　　　7 Sheets-Sheet 1

INVENTOR
Edwin E. Slick
By Thomas G. Miller
His attorney

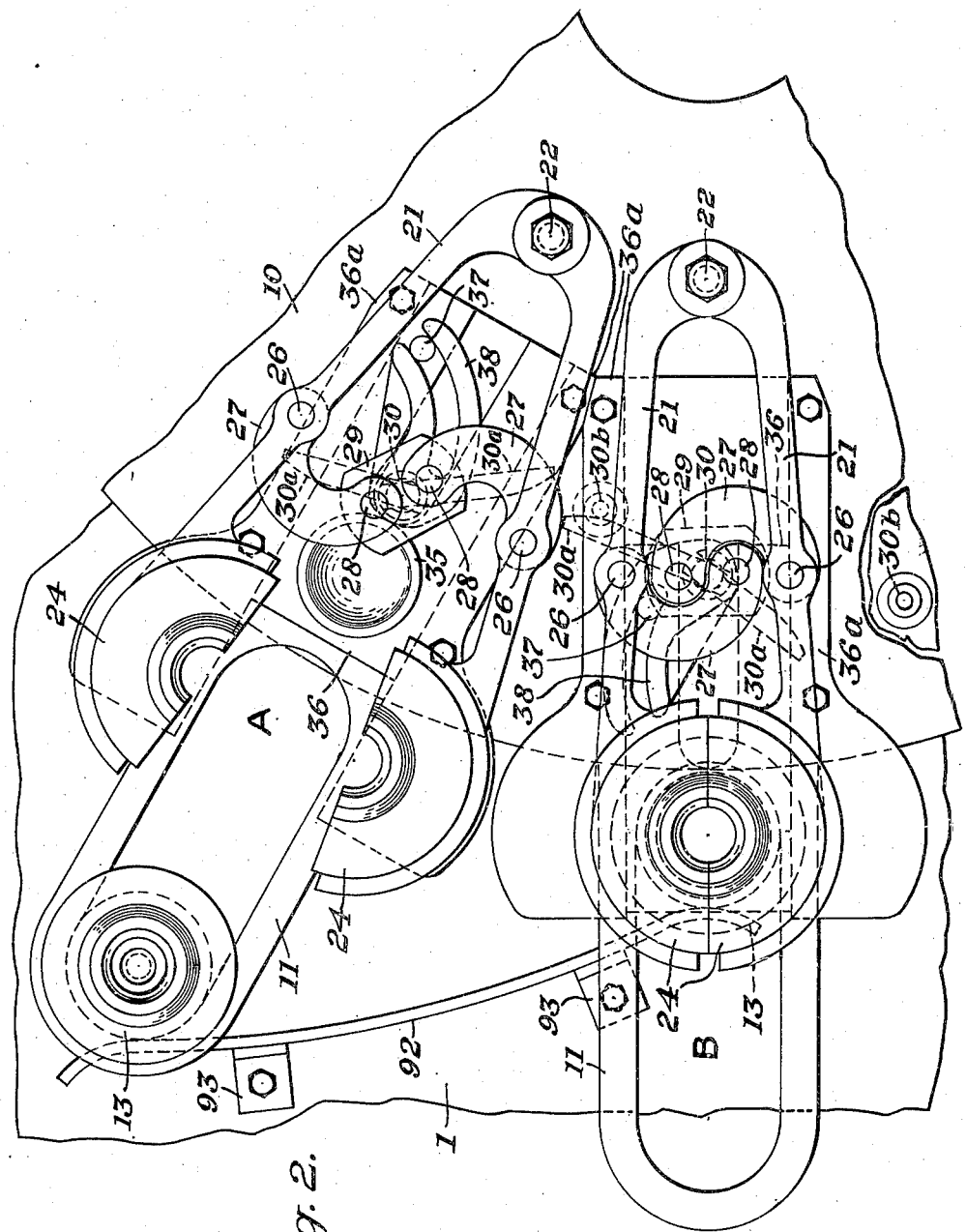

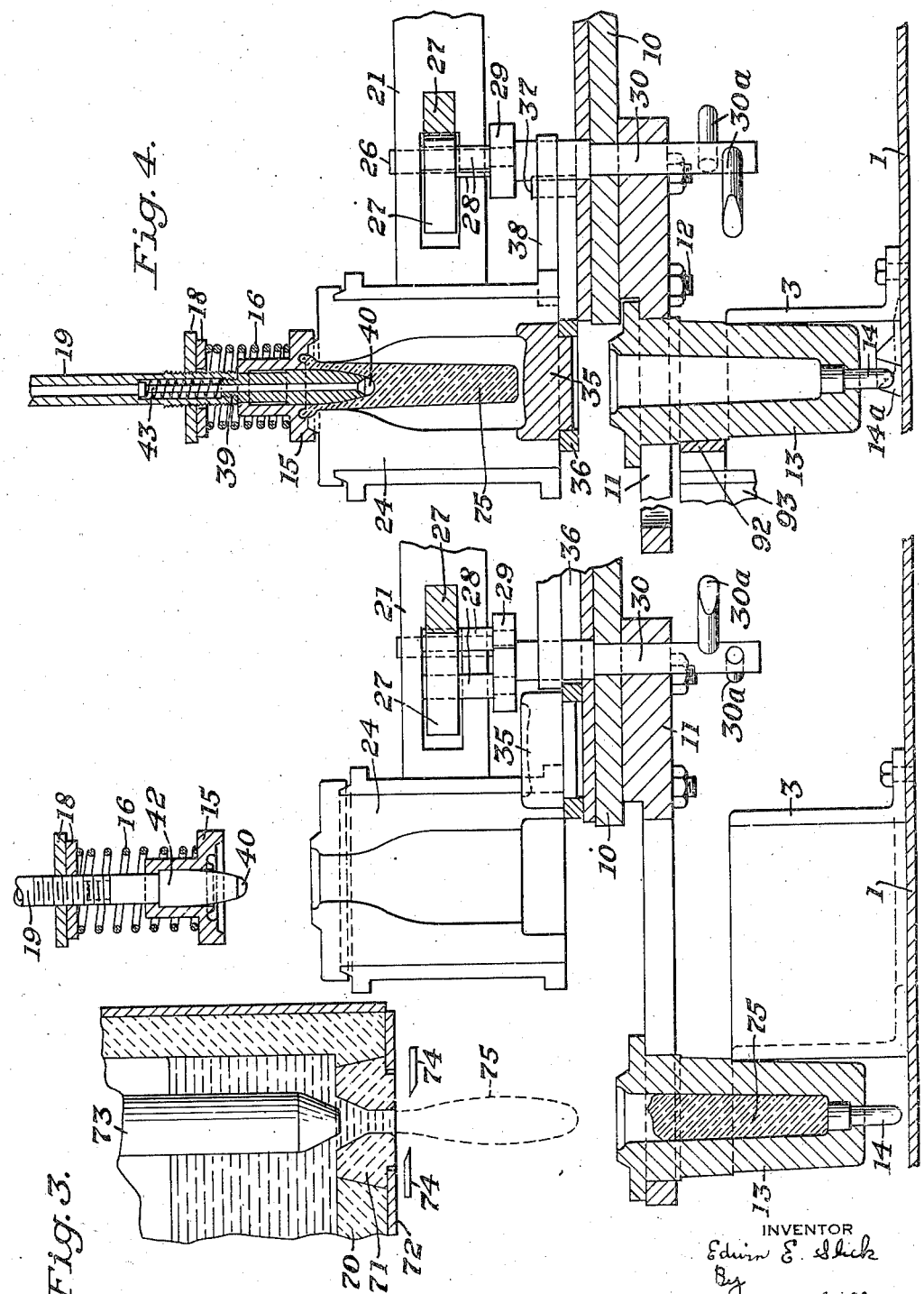

Dec. 26, 1944.   E. E. SLICK   2,366,066
MANUFACTURE OF GLASSWARE
Filed Jan. 30, 1941   7 Sheets-Sheet 6
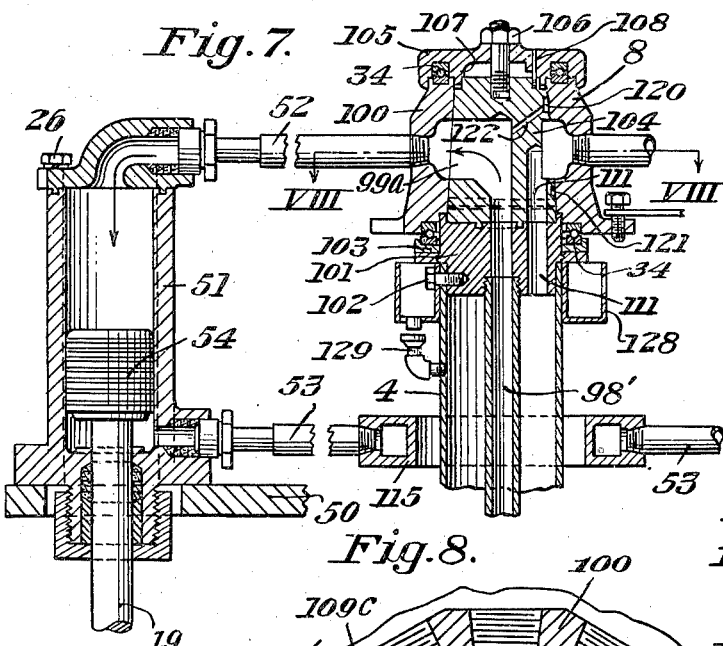
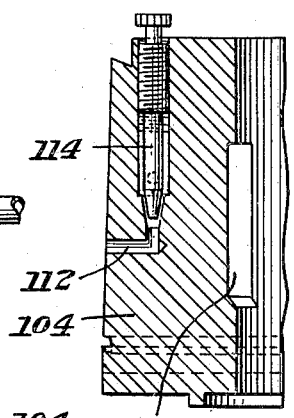
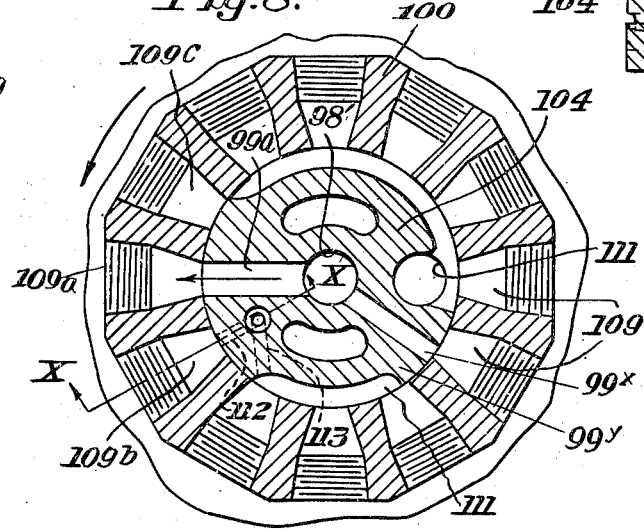
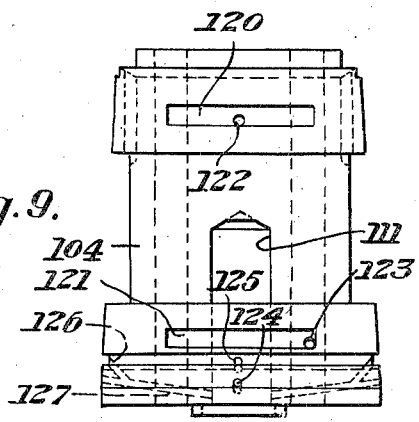
INVENTOR
Edwin E. Slick
By
Thomas G. Miller
His attorney Dec. 26, 1944.  E. E. SLICK  2,366,066
MANUFACTURE OF GLASSWARE
Filed Jan. 30, 1941  7 Sheets-Sheet 7

INVENTOR
Edwin E. Slick
By
Thomas G. Miller
His attorney

Patented Dec. 26, 1944

2,366,066

UNITED STATES PATENT OFFICE 2,366,066

MANUFACTURE OF GLASSWARE

Edwin E. Slick, Pittsburgh, Pa.

Application January 30, 1941, Serial No. 376,614

4 Claims. (Cl. 49—5)

This application is a continuation-in-part of my copending application Serial No. 102,769, filed September 26, 1936, now issued as Patent No. 2,278,572, granted April 7, 1942, Method of manufacturing glass articles.

This invention pertains to the manufacture of ware such as glass articles from liquid, viscous and/or plastic materials, such as molten glass, and more particularly to procedure for collecting, handling and forming such materials, and also to apparatus for carrying out the procedure. The present invention discloses apparatus to be employed in connection with the forming of blown glassware as distinguished from the production of pressed glassware from the press method of said copending application.

In accordance with the present invention, I have provided a simple and effective form of apparatus for collecting, handling, and forming ware. It has been an object of my invention to provide a new and improved procedure for forming glassware which is relatively simple in its operation.

Another object of my invention has been to provide new and improved procedure for forming articles by a press and blow operation.

A further object of my invention has been to provide a new and improved method of handling the materials employed in forming ware.

These and many other objects of my invention will appear to those skilled in the art from the description of the invention, the disclosure of the drawings, and from the appended claims.

In the drawings—

Figure 2 is a top plan section of molds employed in the disclosure of Figure 1;

Figure 3 is a vertical sectional elevation of a portion of the apparatus of Figure 1, and showing a forehearth and an associated feed orifice; in this figure a parison mold has reecived a gather and blow mold sections are in an open position;

Figure 4 is a vertical section somewhat similar to Figure 3, but showing closed blow mold sections containing a parison that has been raised from a parison mold;

Figure 7 is an enlarged sectional elevation showing a detail of the apparatus of Figure 6;

Figure 8 is a horizontal section taken along the line VIII—VIII of Figure 7;

Figure 9 is a vertical elevation of an inner or core portion of a distributor valve shown in Figure 7;

Figure 10 is a fragmental section taken along the line X—X of Figure 8;

In carrying out my invention, I collect a gather or charge of the material to be formed in a parison or blank mold cup. The gather is then partially formed or formed into a parison in the mold cup by a reciprocating, vertically-operating presser-plunger mechanism. The partially formed blank or parison is raised from the blank mold until it is substantially in alignment with the mold sections of an associated, vertically-spaced blow or finishing mold cup. The plunger and a cover plate for the parison mold are raised simultaneously by means of a piston mechanism until they clear the top of the blow mold sections. A bottom cover plate is then moved outwardly to a position in alignment with the open blow mold sections, and the mold sections are closed about this bottom plate by suitable cam means which may be actuated by the movement of the carrier. The plunger is then actuated to move downwardly a slight distance within the blow mold until the cover plate associated therewith closes off the top of such mold. The plunger presses the blank while air is admitted through it to blow the blank; in this manner, the blank is finished to provide an article of ware of the desired shape.

After the article has been formed, the plunger and its associated cover plate are lifted above the blow mold, the blow mold sections are opened, and the article is discharged.

The plunger may be actuated by a pneumatic fluid or by a hydraulic fluid.

In one embodiment of my invention, the gather is dropped into the blank mold from the top thereof, being discharged from a feed orifice. In another embodiment of my invention, the gather is sucked up from the surface of glass in the forehearth within the blank mold cup, the plunger acts to press the blank and to thus partially form it, and the blank mold is raised above the forehearth. However, in both embodiments the plunger and its associated mechanism function in substantially the same manner after the material has been gathered within the blank mold.

In the second-mentioned embodiment the blank mold cup may be raised above the forehearth before the blank is raised out of it towards the finish mold cup. Any suitable form of mechanism may be employed (not shown), to sever the charge or gather from the glass in the forehearth after the blank mold has been raised sufficiently. The severing mechanism is preferably timed to the operation of the machine.

Although the present invention, as will appear from the description thereof, is especially suitable for employment with a continuous machine, yet it may be employed in connection with any suitable type of machine, whether its operation is continuous or intermittent, and whether or not the material is fluid, viscous, or plastic when collected by the blank or parison mold cup or cups.

Figure 1:
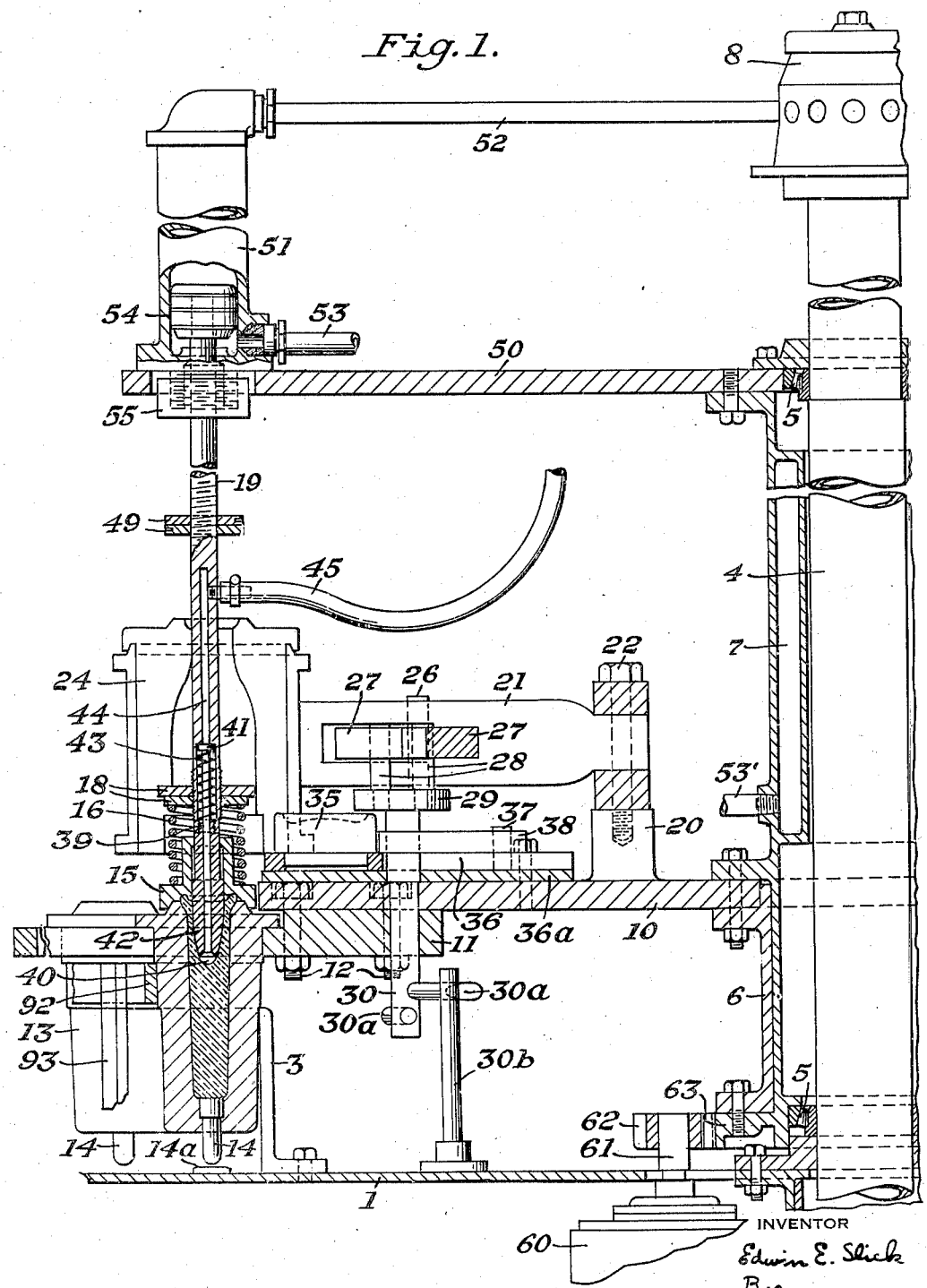
Figure 1 is a vertical section of apparatus constructed in accordance with my invention, and showing a formed parison in a parison mold.

In Figure 1, I have shown a section through such a machine, which includes a bed frame 1, fixedly mounted upon a suitable carriage 1' mounted on axles 2, having wheels 3 thereon which may move along a trackway 4' and which supports a stationary column 6. This column is preferably centrally located and rotatably supports the operating mechanism of the present invention through the agency of bearings 5. The rotating structure of the present invention includes a vertically extending column 6 positioned around the column 4 and supporting radially extending upper and lower carrier tables 50 and 10, respectively.

The vertical column 6 and the associated radially extending carrier members 10 and 50 are rotated by means of a gear reduction unit 60, shaft 61, pinion 62 and gear 63 secured to the column.

The lower table 10 supports a plurality of parison molds at spaced positions therealong, by means of slotted guide plates 11 bolted to the bottom face thereof by suitable bolts 12. As shown, particularly in Figure 2, each guide plate 11 is of U-shaped outline, permitting the cup 13 to move on a horizontal plane radially inwardly and outwardly to glass-collecting and parison-forming positions.

Each blank mold cup 13 is provided with an individual outwardly-extending U-shaped guide member 11 and is moved outwardly to receive a gather of glass 75, as shown particularly in Figure 3, by an upwardly extending fixed cam track 3 that is secured to the stationary framework 1 of the machine. Thus, as the table 10 and its associated blank molds rotate, the cam tracks 3 cooperate with the sides of the parison molds to move them outwardly to receive a charge of glass. The cups 13 may be moved inwardly to receive a parison forming plunger 42 by any suitable means such as tracks 92 mounted by brackets 93 on the table 1. The table 10 may be provided with any suitable number of circumferentially-spaced radially-positioned blank molds 13.

In Figure 3, I have shown a forehearth 70 having suitable plates 72 for supporting a refractory orifice portion 71. A plunger or needle 73 is preliminarily adjusted to provide the desired flow for a given temperature, head, and type of material which is to be utilized. Shear blades 74 have been diagrammatically shown.

A gob 75, see particularly Figure 3, is severed from the glass in the forehearth and blank mold 13 is timed in outward movement to receive it. Then, the mold 13 is moved inwardly, carrying the gather with it to a position in co-axial alignment with a plunger 42 and a blow mold 24.

As seen particularly in Figure 1, I carry blow mold sections 24 upon the same carrier 10 which carries the blank molds 13. A pair of blow mold sections 24 is provided for each of the blank molds 13, and is mounted substantially in alignment with and above the blank molds. A cover plate member 15 serves as a top cover plate for both the parison mold 13 and for its associated blow mold cup 24. It is resiliently and slidably mounted on the plunger operating shaft 19, and is provided with an upwardly projecting sleeve portion which receives a spiral positioning spring 16. Positioning plates 18 are threaded upon the operating stem 19 and hold the other end of the spring 16 in position.

By reason of this construction, the cover plate 15 is resiliently held on the operating shaft 19 and will give to take up any slight variations in the material being formed. The spring 16 is adjusted by rotating the plates 18 about the threaded portion of the shaft 19.

As seen, the bottom face of the cover plate 15 is provided with annulus-shaped edge portions which cooperate with and seal off complementary portions of the top edges of the parison and blow molds, respectively. Spaced inwardly of the edge annulus I have provided an annular groove which provides a receiving portion for the edges of the parison in one case and of the ware in the other case.

A valve 40 is mounted on the vertical operating shaft 39 and is beveled to slidably fit within the lower end of the plunger 42, to seal off the inside of the plunger when a blank is being pressed. The valve 40 and its associated shaft 39 are normally forced upwardly by a spiral spring 43. This spring is positioned on the upper end of the shaft 39; at one end it abuts a valve disc 41 and at the other end, abuts the upper end of the plunger 42. When the plunger 42 has entered the blow mold 24, air under pressure supplied through the line 45 is sufficient to force the valve disc 41 off its seat against the spring 43, and to move the valve 40 outwardly and permit air to enter the mold and blow the blank into a suitably shaped article. The plunger is provided with an axially extending air passage 44.

The plunger 42 is preferably removably secured to the operating or reciprocating shaft 19, in order that various sizes and shapes may be employed to form different articles. As shown in Figure 4, the lower end of shaft 19 is threaded to fit over a threaded offset portion of the plunger 42.

A post 20 extends from the carrier table 10 and receives a pivot bolt 22 which pivotally supports a pair of pincer-like arms or blow mold section support members 21. Each mold support arm 21 is, at its other end, provided with a substantially semi-circular sleeve-like portion within which a mold section 24 is positioned. The arms 21 are moved inwardly and outwardly with respect to each other about their common axis 22, by a pair of semi-circular operating links 27. Each link is at one end pivotally connected substantially centrally by a pin 26 to a mold support arm 21 and is at its other end pivotally mounted by a pin 28 on a cam plate member 29. The cam plate member 29 is in turn feathered to a vertically-extending operating shaft 30 which is actuated to turn in either direction by cams 30a that cooperate with suitable fixed cams 30b extending from the framework 1.

By reason of the shape and arrangement of the links 27, they have an accelerated action during the major portion of their movement and a decelerated action when starting and stopping. This prevents any shock to the mechanism and provides a quick acting cup-opening and closing operation. The movement is fast when the links move off center and relatively slow when they first leave and then again approach center; they also securely lock the mold sections 24 in position and hold them locked for a desired period while the rotation of the carrier 6 continues. The links 27 are thrown substantially in line to lock, see B, Figure 2.

In Figure 2, A represents the position of the blow mold sections 24 and of their associated arms 21 and links 27 when they are separated with respect to each other. The parison mold 13 is shown in its radially extended position for receiving a gather or charge. B of the same figure shows the blow mold in a closed position after the plunger has been raised thereabove, and also shows the parison mold 13 in a retracted position at which a parison has been formed.

Each blow mold 24 is provided with a bottom cover plate 35, which has a rearwardly extending pair of bifurcated slide arms 36. The slide 36 is positioned at opposite sides by a pair of spaced guide rails 36a that are bolted to the table 10. The bottom plate 35 is radially retracted by means of a pin guide 37 extending upwardly from one bifurcation of the portion 36 and cooperating with a curved bifurcated operating arm 38. This arm 38 at one end receives the pin 37 within its bifurcations, and at its other end is feathered to the vertical operating shaft 30 in such a manner that a partial rotation or turn of the shaft 30 first causes the bottom plate 35 to move outwardly into substantial alignment with the mold sections 24 before the mold sections actually close about it.

Figure 6:
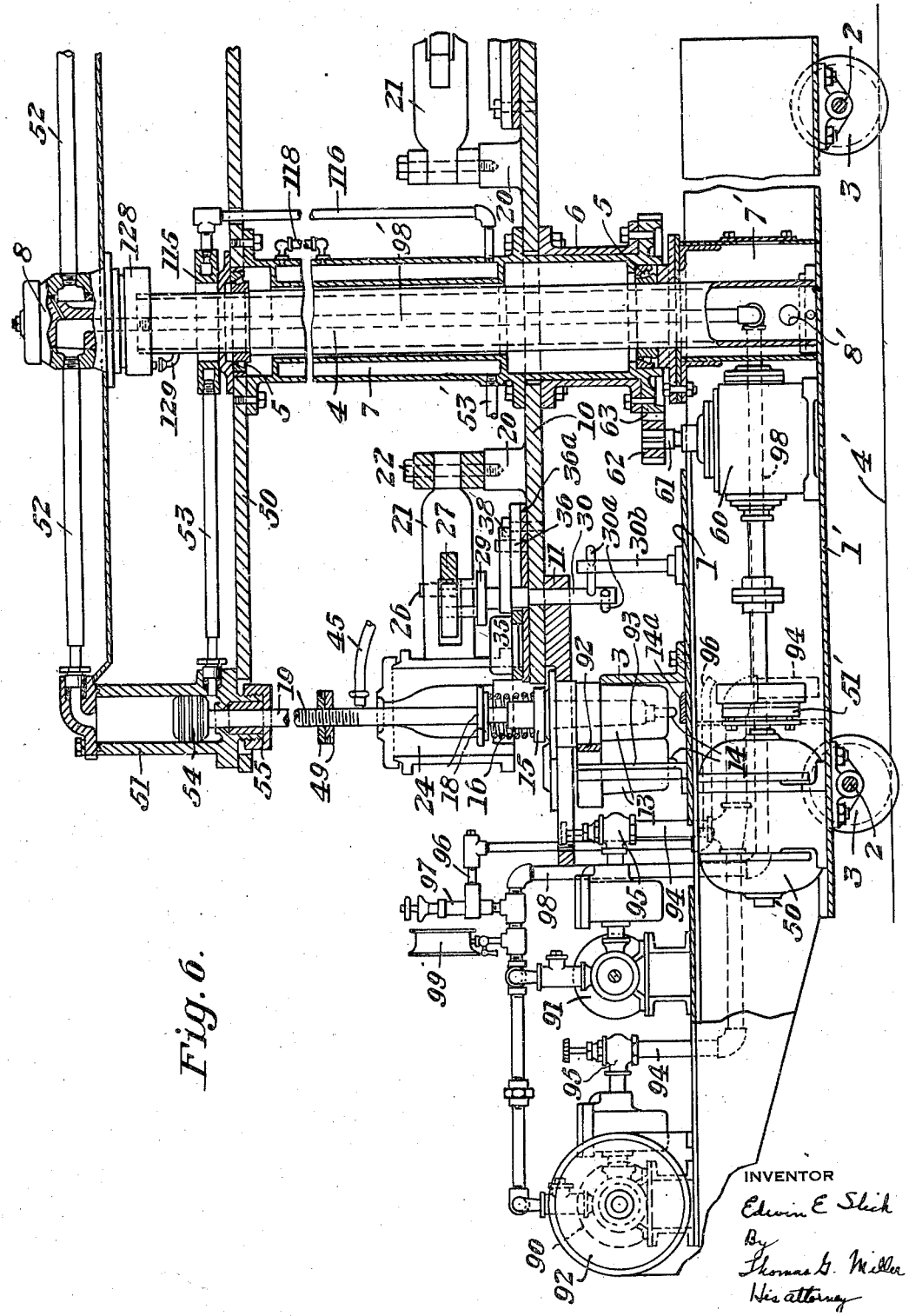
Figure 6 is a side elevation partially in section of a machine embodying features of my invention.
Figure 11:
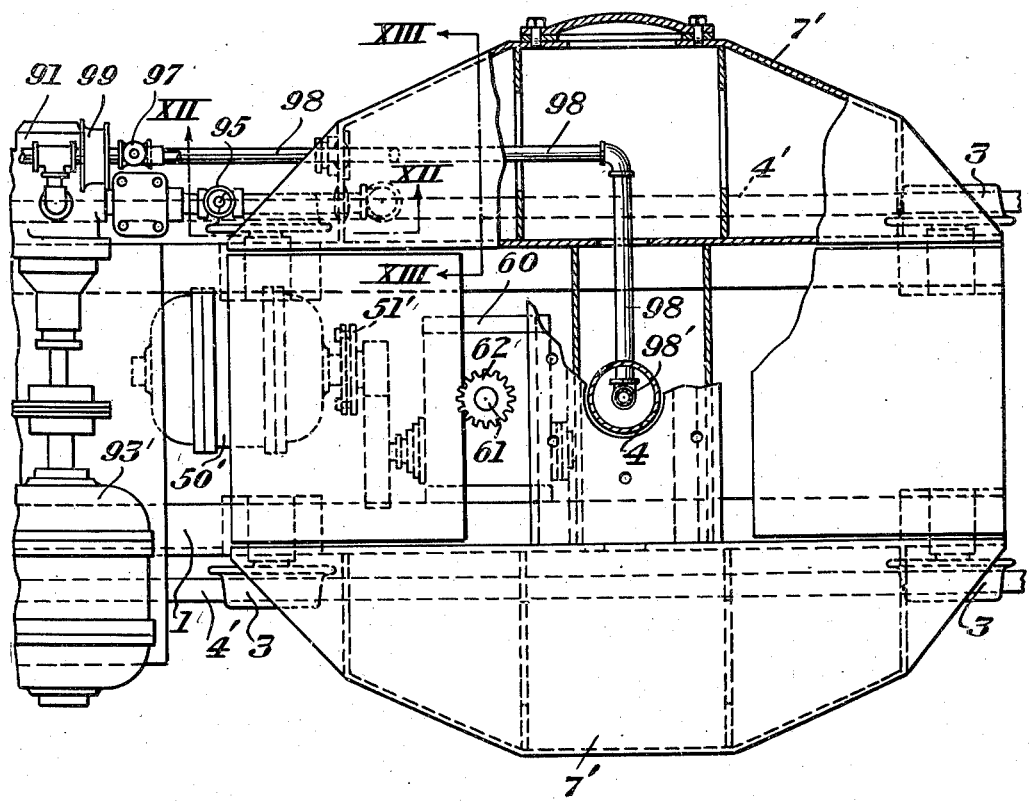
Figure 11 is a top plan view of the lower portion of the apparatus illustrated in Figures 6 and 7, showing a fluid reservoir, the figure being partly sectional.
Figure 12:
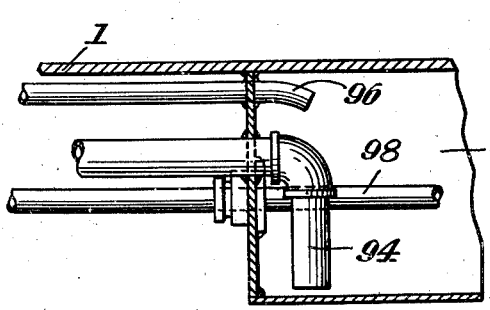
Figures 12 and 13 are fragmental sections taken along the lines XII—XII and XIII—XIII, respectively, of Figure 11.
Figure 13:
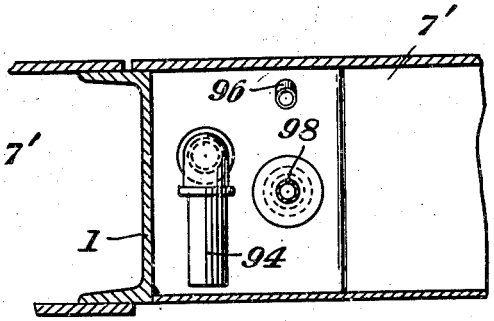

The upper carrier 50 extends radially outwardly from the rotating vertical column 6 and supports operating cylinders 51 for the pistons 54. Each pair of vertically-spaced parison and blow mold cups is preferably provided with an associated plunger 42 and operating chamber 51. A screw sleeve 55 fits on a threaded extending portion of the chamber 51 and seals packing therein in a suitable manner. I have also shown, see Figure 1, adjustable plates 49 which are threaded upon the plunger operating shaft 19 to limit the upward stroke of the piston 54. An inlet pipe for putting fluid under pressure into the chamber 7 is indicated at 53' in Figures 1 and 6.

Figure 5:
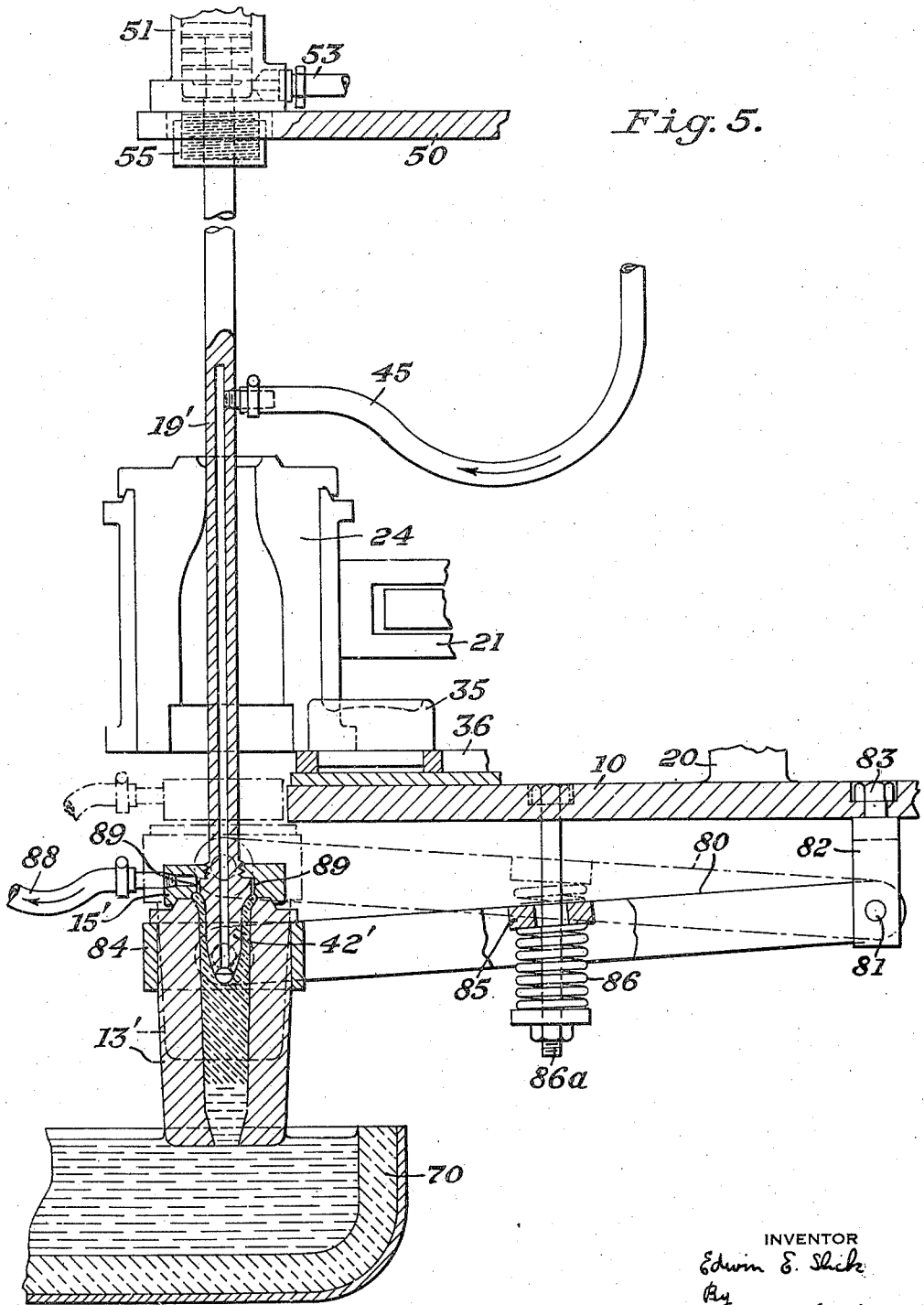
Figure 5 is a vertical sectional elevation of a modified form of structure employing my invention and having a suction type of parison mold adapted to skim the surface of glass in a forehearth.

In the modified form of my invention shown in Figure 5, the blank mold cup 13' is provided with a collar 84 which is supported by a substantially horizontally-extending arm 80. Arm 80 is pivotally mounted at one end by a pin 81 upon a post 82 extending downwardly from the carrier table 10, and is removably secured to such table by bolts 83. The arm 80 which is provided for each of the blank molds 13' is substantially centrally hollowed out to provide a positioning annulus 85 against which a spring 86 is adapted to abut. A bolt 86a extends downwardly from the carrier 10 to position spring 86 and to movably hold the cup 13' in a raised position with respect to the table. The plunger 42' and its associated plate 15' move the cup 13' downwardly and compress spring 86 at the proper timed instant during the rotation of the table 10. The cup 13' will then skim across the glass in the forehearth 70 while glass is being sucked up by suction applied to line 88. After a charge has been gathered, the pressure against plunger 42' is released and spring 86 snaps the cup 13' back, see the dotted lines of Figure 5. As the operation of this modification is otherwise substantially the same as the previously described structure, further description is unnecessary.

In this embodiment, the top cover plate 15' is removably screw-threaded to the enlarged portion of the operating shaft 19, and the plate has vertical ports 89 between its inner walls and the outer walls of the piston 42', in order that the suction line 88 will have passage to the inside of cup 13' when the cover plate 15' is in place.

In operation, a glass charge is dropped into the parison mold 13 in the embodiment of Figure 3 and is sucked up in the parison mold 13' in the embodiment of Figure 5. The parison mold 13 is then moved radially inwardly in the embodiment of Figure 1 to a position in alignment with its associated, but upwardly-spaced pair of blow mold sections 24.

Fluid is introduced through the valve 8, see Figure 1, into the line 52 to actuate the piston 54 and move it downwardly. Piston 54 moves the plunger 42 and its associated valve 40, as well as the top cover plate 15, to a cooperative position with respect to the top portion of the blank mold 13. As the plunger portion 42 moves within the mold, the collected or gathered glass is partially formed, being pressed and forced upwardly against the cover plate 15 and within the grooved, lip-forming portion thereof. Then, a cam 14a on the frame 1 actuates a knock-out 14, and simultaneously therewith, fluid is admitted through line 53 to the lower side of cylinder 51, causing the plunger 42 and top plate 15 to move upwardly. The upper side of the cylinder is at this time connected to exhaust from line 52 through valve 8. Although I show a valve mechanism 8, the flow of fluid to and from the cylinder 51 may be controlled by any suitable mechanism, preferably timed to the rotation of the carrier tables.

I contemplate employing a suction force to aid the plunger 42' in holding or gripping the partially-formed blank while it is being lifted to the finish mold 24. That is, the suction force may be maintained in line 88, see Figure 5, to aid the plunger 42' in partially forming a blank and in lifting it out of the cup 13'. Of course, it is apparent that the suction aid method can be readily applied to the embodiment of my invention shown in Figure 1 of the drawings. Suction may be applied to line 88 by a valve mechanism (not shown) timed in accordance with the operation of the machine. Valves useful in accomplishing this purpose are now well known in the art and form no part of the present invention and any suitable valve arrangement may be employed.

After the plunger 42 has been sufficiently raised in order that the top plate 15 will clear the blow mold sections 24, the bottom cover plate 35 is then moved outwardly to a substantially coaxial position with respect to the mold sections 24, and the mold sections 24 are closed about the bottom plate 15 and locked in this position, see B of Figure 2, by reason of the cooperative action of the links 37 and the arms 21 when the links are thrown substantially on center. At this time, the plunger 42 and its associated cover plate 15 are moved downwardly to close off the top of the blow mold sections. That is, a fluid under pressure is permitted to again enter the upper portion of the chamber 51 to actuate the piston 54 in its downward movement. To accomplish this the valve shown in Figure 8 is designed to momentarily admit fluid to the top of each pressure cylinder 51 immediately preceding and during the blowing stage. This is indicated in Figure 8 where passage 99x leads radially from the chamber 98' to the periphery of raised portion 99y on the member 104. After this has been done, air is forced through the line 45 and the ware formed. Valves suitable for intermittently controlling the flow of fluid to a blow mold on a traveling carrier are well known in the art and constitute no part of the present invention, and any suitable valve may be employed.

After an article of ware has thus been formed, cams again actuate the shaft 30 to first open the partible sections 24 and then to withdraw the bottom cover plate radially backwardly out of position. The ware is then discharged and the plunger 19 again moved downwardly to a cooperating relationship with respect to a blank mold 13 in the manner previously explained, and the cycle is continued.

Attention is called to the fact that my invention is not limited to the forming of glassware, although it has particular application in such a connection, and that it may be successfully employed for the forming of articles from various types of materials, without departing from the spirit of the invention.

As previously pointed out, I have shown the features of the present invention as applied to a hydraulic machine. Such machine provides for a substantially continuous rotation of a mold carrier and supplies hydraulic fluid in a timed relation by the valve 8 to each of the succession of hydraulic motors or piston chambers 51, see Figure 1 of the drawings. The introduction of the hydraulic fluid is controlled by the valve 8 in such a manner as to introduce hydraulic pressure fluid through each line 52 to successively operably connect each of the plurality of piston cylinders 51 to a hydraulic motor supply means. The hydraulic fluid is continuously supplied by suitable motor driven individual pumps, preferably of a constant displacement type, that will provide a constant quantity of fluid at a pressure that varies directly or in direct proportion to the resistance encountered by the piston 54. Each piston 54 is successively returned to its original upper position when the fluid is cut off through one of the lines 52, as this permits the compressed air in an accumulator 7 and line 53 to effect an upper movement. The spring 86 provides means for lifting the cup out of cooperative relation with the glass in the forehearth of the furnace 70.

Since the valve 8 connects each of the cylinders 51 in turn successively to the supply or source of hydraulic fluid, it will be apparent that the cups 13' of the embodiment of Figure 5 are, in turn, forced downwardly in succession to permit the sucking up of charges.

As will be appreciated from the previous description, the upper carrier member 50 is mounted to extend outwardly and support a plurality of blank forming mechanisms 51, for example, twelve. Each mechanism 51 is provided at its upper end with a suitable telescopic pressure line 52 connected to the housing member 100 which is rotatably journaled by bearings 34, see Figure 7. The lower end of the piston chamber 51 is connected through telescopic line 53 to an annular accumulator header 115 which, in turn, is connected through suitable piping 116 to an accumulator chamber 7 which extends inwardly and vertically along the rotary frame 4. A suitable gauge 118 has been provided. In order to have a smoothly acting rotary distributor core 104 that will not lock during certain periods of its movement, I have provided suitable balancing deadend slots 120 and 121 connected by passageways 122 and 123 to the pressure chamber 99a, see Figures 7 and 9. Drain passages 124, 125, 126, and 127 are connected to the exhaust chamber 111. I have also provided an annular extending drip trough 128 connected by a drain pipe 129 to the exhaust chamber or passage 111 in the valve base.

As will be seen, the motor 50' drives the gear reduction unit 60 through a suitable clutch 51'. I have also provided a suitable reservoir 7' for hydraulic fluid such as water or oil, a pair of rotary pumps 90 and 91 connected in parallel and driven by motors 92 and 93'. The pumps have a suction line 94, a valve 95 for controlling the flow therethrough, a relief line 96, and an automatic relief valve 97. A pressure line 98 is connected to a vertical pipe 98' that extends upwardly through the center column of the machine. The numeral 99 represents a suitable pressure gauge. Of course, both the relief line 96 and the suction line 94 enter the reservoir 7'. The inside of the column 4 acts as an exhaust line for forming mechanisms 51 since it is connected at its lower end by a pipe 8' to reservoir 7', see Figure 6.

The control mechanism includes a distributing valve 8 mounted at the top of the center column 4, see particularly Figures 6–10, inclusive. This valve comprises a base portion 101 removably secured to the column 4 by suitable bolt means 102. The base 101 has an annulus portion 103 adjacent its upper face for supporting the lower bearing 34. A central core portion 104 rests upon, is keyed to and extends above the base portion 101. It has a cap member 105 secured thereto by bolt means 106 and locked with respect thereto by extensions 107 and pins 108. The cap portion 105 is grooved to receive the upper bearings 34 and the rotary outer chamber housing portion 100. As seen, the chamber housing 100 extends between the upper and lower bearings 34 and rotates about the central core portion 104.

In Figures 7, 8, 9, and 10, I have shown the operation of the valve. The chamber housing member 100 is provided with the same number of chambers 109 as there are pressure cylinders 51 and each of these chambers is connected by telescopic pipe 52 to its respective piston chamber. In Figure 7 the pressure line is shown connected directly to cylinder 51 and the plunger 54 is moving downwardly.

The position of the rotary distributor valve in Figure 8 indicates its relationship when one plunger mechanism is being moved vertically downwardly. All but two of the chambers 109a and 109c are directly connected to the exhaust passageways 111 of the valve, while the chambers immediately adjacent the chamber 109a which is receiving the hydraulic fluid are completely shut off from any flow, except that the chamber 109b is connected by suitable passageways 112 and 113 to the exhaust 111; the flow through these passageways is controlled by an adjustable needle valve 114, see particularly Figure 10. That is, when the chamber 109a is receiving actuating fluid, the chamber 109b has been cut off from any actuating or pressure fluid and has been slightly opened to the exhaust in order that an accumulator mechanism as hereinbefore described can slowly initiate a return movement of the piston 54. After a short period of slow movement, the rotation of the carriers brings the chamber 109b directly in line with the exhaust passageway 111 and permits the accumulator to immediately snap back the piston 54 and its associated mechanism to their original positions. Viewed from Figure 8, the chamber 109c is closed off to the exhaust 111 immediately before it is opened to the pressure chamber 99a.

It will be apparent from the above description that the machine continuously rotates while charges are taken up, formed, and discharged, and that such operations are periodic in sequence during the continuous rotation of the carrier and as effected by the operation of the valve 8.

While I have described certain embodiments of my invention for the purpose of illustration, it will be apparent to those skilled in the art that many changes, modifications, substitutions, additions and omissions or combinations thereof may be made without departing from the spirit and scope of the invention as indicated in the appended claims.

I claim:

1. In a machine for forming shapes from a suitable material such as glass, a series of blank molds, means for moving the blank molds about a vertical axis, a series of hydraulic means for periodically moving the molds vertically to a charge-receiving station, there being one such hydraulic means for each mold valve means to selectively connect said hydraulic means in succession to a source of actuating fluid at a predetermined position in the movement of the molds about the vertical axis, and resilient means for successively moving the molds vertically away from the charge-receiving station after they have received a charge at a predetermined position in the movement of the molds about the vertical axis.

2. In a machine for forming shapes from a suitable material such as glass, rotatable carrier means, molds carried by said means, a charge-forming means carried by said carrier means over each mold, said charge-forming means being operably positioned to periodically move their respective molds vertically to a charge-receiving station, separate hydraulic means for actuating each of said last-mentioned means, and means to periodically connect said separate hydraulic means to a common source of liquid under pressure in sequence in predetermined relation to the rotation of said carrier means.

3. A glass blowing machine comprising a turntable having a circular series of blow heads concentrically arranged thereon, a series of gathering molds on the turntable one for each blow head, each mold being movable independently of the others into and out of charge-receiving position, a corresponding series of divided molds each in a plane above its gathering mold and each independently movable to a closed and an open position, a separate fluid pressure cylinder on the turntable for operating each blow head from a position to engage its gathering mold to a position to engage its divided mold and to a position to clear each of its said molds, a distributing valve operated by rotation of the turntable for successively operating each cylinder and blow head through its cycle of movements, and means operated by movement of the turntable for actuating the gathering and divided molds in timed relation to the movement of the blow heads.

4. A glass blowing apparatus comprising a carrier, means for rotating the carrier, a plurality of equidistantly spaced blow heads on the carrier, a separate blow head operating unit for each blow head to effect a raising and lowering movement thereof, a vertically movable gathering mold on the carrier under each blow head to be intermittently engaged by the blow head and having a range of vertical movement less than that of the blow head whereby the blow heads and the gathering molds may be lowered in engagement with each other and raised together for a limited distance after which the blow head may lift clear of the gathering mold to remove a charge therefrom, a divided blow mold over each gathering mold with which the blow head also cooperates, means operated by movement of the carrier for opening and closing said divided molds in succession, a glass pot over which the carrier moves the gathering molds in succession, and means controlling the operation of the blow head operating unit adapted to move the blow heads and their accompanying gathering molds down into said pot as the said gathering molds move thereover and then upwardly, each gathering mold having a suction line attached thereto through which glass may be drawn from said pot into each gathering mold when the gathering mold is so moved down.

EDWIN E. SLICK.